US007567069B2

(12) United States Patent
Ryu et al.

(10) Patent No.: US 7,567,069 B2
(45) Date of Patent: Jul. 28, 2009

(54) STEP-UP POWER SUPPLY DEVICE

(75) Inventors: Takashi Ryu, Kyoto (JP); Takuya Ishii, Osaka (JP); Mikio Motomori, Osaka (JP); Kazuhito Kimura, Kyoto (JP); Satoshi Wada, Osaka (JP); Rumi Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 189 days.

(21) Appl. No.: 11/898,701

(22) Filed: Sep. 14, 2007

(65) Prior Publication Data
US 2008/0074158 A1 Mar. 27, 2008

(30) Foreign Application Priority Data
Sep. 22, 2006 (JP) ............................. 2006-257056

(51) Int. Cl.
G05F 1/40 (2006.01)
H02M 3/18 (2006.01)
(52) U.S. Cl. .................... 323/282; 323/901; 363/49; 363/59
(58) Field of Classification Search ............... 323/265, 323/282, 283, 901; 363/49, 59, 60
See application file for complete search history.

(56) References Cited
U.S. PATENT DOCUMENTS

| 4,740,742 | A | * | 4/1988 | Gontowski, Jr. ............ 323/313 |
| 5,867,013 | A | * | 2/1999 | Yu .............................. 323/314 |
| 5,889,393 | A | * | 3/1999 | Wrathall ..................... 323/282 |
| 6,677,808 | B1 | * | 1/2004 | Sean et al. ................... 327/539 |
| 7,034,586 | B2 | * | 4/2006 | Mehas et al. ................. 327/143 |
| 7,199,565 | B1 | * | 4/2007 | Demolli ....................... 323/273 |

FOREIGN PATENT DOCUMENTS

| JP | 1-295665 | 11/1989 |
| JP | 2-273070 | 11/1990 |
| JP | 9-74742 | 3/1997 |
| JP | 2805814 | 7/1998 |
| JP | 2003-92873 | 3/2003 |
| JP | 2005-160155 | 6/2005 |
| JP | 2006-32004 | 2/2006 |
| JP | 2006-149065 | 6/2006 |
| JP | 2007-89278 | 4/2007 |
| JP | 2007-97361 | 4/2007 |

* cited by examiner

Primary Examiner—Adolf Berhane
(74) Attorney, Agent, or Firm—McDermott Will & Emery LLP

(57) ABSTRACT

A step-up power supply device includes: a step-up converter; a startup circuit which controls the on/off operation of a switch element of the step-up converter when an output voltage of the device is smaller than a reference voltage; and a control circuit which operates in substitution for the startup circuit when the output voltage is higher than the reference voltage to control the on/off operation of the switch element such that the output voltage reaches a target value. The startup circuit includes an oscillation circuit for generating a pulse signal which has a predetermined on/off ratio, a current comparison circuit for comparing a current of the switch element with a predetermined restriction value, and a drive circuit for generating a drive signal based on which the switch element is turned on/off, the drive signal being generated from the pulse signal to turn on the switch element, and the drive signal being generated from the output of the current comparison circuit or the pulse signal to turn off the switch element.

9 Claims, 6 Drawing Sheets

STEP-UP POWER SUPPLY DEVICE

BACKGROUND OF THE INVENTION

1. Field of the Invention

The present invention relates to a step-up power supply device for supplying a DC voltage to various electronic devices and specifically relates to a step-up power supply device which includes a switchable step-up converter.

2. Description of the Prior Art

In recent years, the switchable step-up converter has been used as a step-up power supply device in various electronic devices which operate on batteries used as power supplies because of its highly-efficient power conversion characteristics. Since the voltage of the battery depends on the energy remaining in the battery, a lower input voltage of the step-up power supply device has been generally used for the purpose of using the electronic device for long hours without replacing or charging the battery. For example, in the case of two AA batteries connected in series, there is a demand that a low battery voltage, which is as low as the lower limit operation voltage of 1.5 to 1.8 V, is boosted for use in electronic devices.

An example of such a step-up power supply device is disclosed in Japanese Laid-Open Patent Publication No. 2003-92873. FIG. 7 shows a circuit structure of the step-up power supply device disclosed in FIG. 1 of this publication. In FIG. 7, the step-up power supply device includes an input power supply 1, a step-up converter 20, a startup circuit 30, and a control circuit 40. The step-up converter 20 includes an inductor 2, a switch element (bipolar transistor) 3, a diode 4, and an output capacitor 5. The startup circuit 30 which carries out a switching operation based on a low input voltage to supply drive signal V3 which is used for controlling the state (on/off) of the switch element 3 of the step-up converter 20 such that output voltage Vo of the step-up converter 20 is boosted. The control circuit 40 controls the on/off conduction ratio (duty ratio) based on input voltage Vi which is equal to or higher than reference voltage Vr.

The inputs of the startup circuit 30 and step-up converter 20 are connected to the input power supply 1. The input of the control circuit 40 is connected to the output of the step-up converter 20. Drive signals V3 and V4 respectively output from the startup circuit 30 and the control circuit 40 drive the current in the base of the switch element 3 of the step-up converter 20. A voltage supply circuit 50 generates reference voltage Vr. A comparator 51 compares output voltage Vo and reference voltage Vr. The output of the comparator 51 serves as a startup signal for the control circuit 40 and also serves as a startup signal for the startup circuit 30 via an inverter 52. When output voltage Vo is lower than reference voltage Vr, the comparator 51 outputs L-level to cause the startup circuit 30 to operate and, meanwhile, stop the control circuit 40 in normal driving mode so that its output terminal of drive signal V4 is rendered floating. When, to the contrary, output voltage Vo is higher than reference voltage Vr, the comparator 51 outputs H-level to cause the control circuit 40 to operate and, meanwhile, stop the startup circuit 30 so that its output terminal of drive signal V3 is rendered floating.

With the above structure, even if input voltage V1 from the input power supply 1 is low, the startup circuit 30 outputs drive signal V3 which is used for controlling the state (on/off) of the switch element 3 till output voltage Vo of the step-up converter 20 is boosted up to reference voltage Vr. Accordingly, the control circuit 40 is caused to operate so that output voltage Vo of the step-up converter 20 reaches a target value.

However, if the step-up power supply device having the above-described conventional structure operates in a low input voltage condition, output voltage Vo need to be boosted up to reference voltage Vr. Therefore, the drive signal output from the startup circuit 30 which is used for controlling the state (on/off) of the switch element 3 has a large duty ratio. In the case of a high input voltage, the switching current flowing from the inductor 2 to the switch element 3 is large. Thus, an inrush current flows at the time of startup, which deteriorates the performance of the battery of the input power supply 1.

The switch element 3 is formed by a bipolar transistor and the drive voltage is clamped on 0.7 V, such that in the case of a low input voltage no current flows via a parasitic diode which exists in the drive stage of the startup circuit 30. However, the bipolar transistor produces a large drive loss, and a higher switching frequency is difficult to achieve.

SUMMARY OF THE INVENTION

The present invention provides solutions to the above-described problems in the prior art. An objective of the present invention is to provide a step-up power supply device wherein a switch element formed by a MOS transistor is commonly used for startup and normal operation, and desirable startup characteristics are achieved while an inrush current is suppressed.

A solution brought about by the present invention for achieving the above objective is a step-up power supply device including: a step-up converter including an inductor and switch element which are connected in series and a rectifier and smoother which rectify and smooth a voltage across the switch element, the step-up converter being designed such that an input voltage to the inductor is boosted by an on/off operation of the switch element and an output voltage is output from the smoother; a startup circuit which controls the on/off operation of the switch element when the output voltage is smaller than a reference voltage; and a control circuit which operates in substitution for the startup circuit when the output voltage is higher than the reference voltage to control the on/off operation of the switch element such that the output voltage reaches a target value. The startup circuit includes an oscillation circuit for generating a pulse signal which has a predetermined on/off ratio, a current comparison circuit for comparing a current of the switch element with a predetermined restriction value, and a drive circuit for generating a drive signal based on which the switch element is turned on/off, the drive signal being generated from the pulse signal to turn on the switch element, and the drive signal being generated from the output of the current comparison circuit or the pulse signal to turn off the switch element. With this structure, the peak value of the current flowing through the switch element is restricted even in the case of a high input voltage so that an inrush current is suppressed.

Preferably, the step-up power supply device further includes: a comparator for comparing the output voltage and a predetermined voltage value to drive any one of the startup circuit and the control circuit based on a result of the comparison; and a delay circuit for delaying, at a transition from the startup circuit to the control circuit, start of an operation of the control circuit for a predetermined time interval. With this structure, at a transition from the startup circuit to the control circuit, simultaneous operation of these circuits is avoided.

Preferably, the ratio of OFF-period in one cycle of the pulse signal is smaller than the ratio of a minimum value of the input voltage and the reference voltage. With this feature, the output voltage is surely increased to the reference voltage in the case of a low input voltage.

Preferably, the current comparison circuit includes a comparator for comparing an ON-voltage of the switch element and a predetermined threshold voltage. More preferably, the drive circuit neglects a comparison result of the comparator during a predetermined period after the switch element is turned on. With these features, current detection is achieved in a low-loss fashion, and the effects of error operations of the comparator which would occur when the switch element is turned on are avoided.

Specifically, the drive circuit generates, as the drive signal, a signal based on which the switch element is turned on at a rise of the pulse signal and is turned off when the output of the current comparator indicates that the ON-voltage of the switch element is equal to or higher than the predetermined threshold voltage or at a fall of the pulse signal. With this feature, desirable startup characteristics are achieved in a wide range from a low input voltage to a high input voltage while an inrush current is suppressed.

More preferably, the switch element is an NMOS transistor; the predetermined threshold voltage of the current comparison circuit is set lower as the input voltage is higher; and the drive circuit employs the input voltage as a supply voltage. Alternatively, the switch element is an NMOS transistor; the predetermined threshold voltage of the current comparison circuit is set lower as the output voltage is higher; and the drive circuit employs the output voltage as a supply voltage. With these features, variations in the characteristics of the switch element are corrected so that the inrush current is more efficiently suppressed.

Preferably, the step-up power supply device further includes: a comparator for comparing the input voltage and the output voltage; and a switch circuit which is driven according to an output of the comparator such that the switch circuit outputs the input voltage when the input voltage is higher but outputs the output voltage when the output voltage is higher. Herein, the drive circuit employs an output of the switch circuit as a supply voltage. With this structure, the startup circuit is supplied with the higher one of the input and output voltages as the supply voltage. Thus, a current flow via a parasitic diode which exists in the drive stage in normal operation with a low input voltage is prevented.

DESCRIPTION OF THE PREFERRED EMBODIMENTS

Hereinafter, embodiments of the present invention will be described in detail with reference to the drawings.

Embodiment 1

Figure 1:
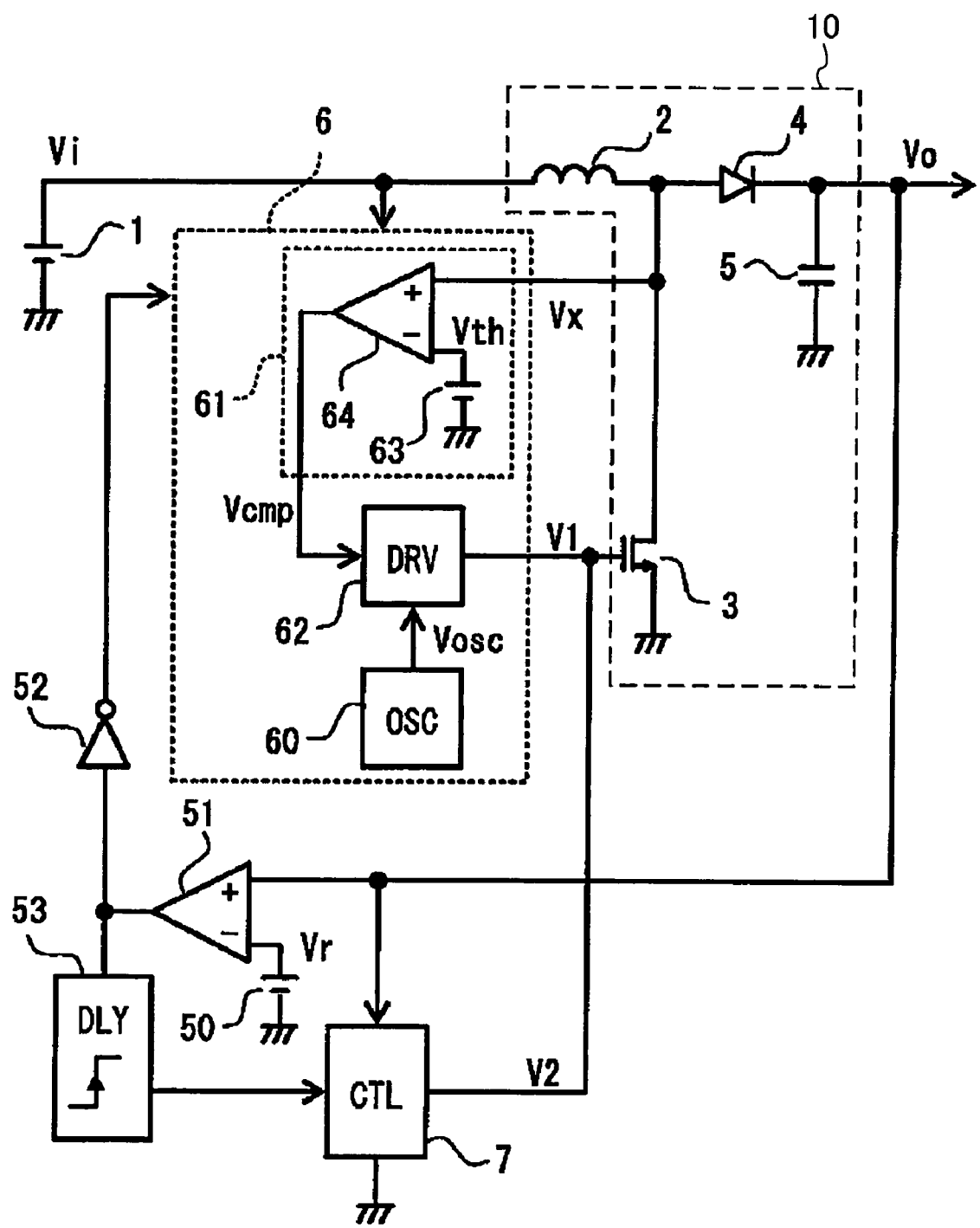
FIG. 1 shows a circuit structure of a step-up power supply device according to embodiment 1 of the present invention.

FIG. 1 shows a circuit structure of a step-up power supply device according to embodiment 1 of the present invention.

Referring to FIG. 1, a step-up converter 10 includes: an input power supply 1 for supplying DC input voltage V1, which is realized by a battery, or the like; an inductor 2, one end of which is connected to the input power supply 1; an NMOS transistor (switch element) 3 having a drain connected to the other end of the inductor 2 and a source grounded; a diode (rectifier) 4 having an anode connected to the drain of the switch element 3; and an output capacitor 5 connected to the output of the rectifier 4 (i.e., the cathode of the diode) for supplying output voltage V0.

When the switch element 3 is ON, a current flows from the input power supply 1 to the switch element 3 via the inductor 2 so that the inductor 2 is excited. When the switch element 3 is OFF, a current flows from the input power supply 1 via the inductor 2 and the rectifier 4 to charge the output capacitor 5. Output voltage Vo supplied from the output capacitor 5 to the load (not shown) is higher than input voltage Vi and can be controlled according to the ratio of the ON period in one switching cycle of the switch element 3, i.e., duty ratio δ. In the normal operation, output voltage Vo is expressed as follows:

$$Vo = Vi/(1-\delta).$$

Referring to FIG. 1, the step-up power supply device of embodiment 1 includes a startup circuit 6 which carries out a switching operation based on a low input voltage to supply drive signal V1 which is used for controlling the state (on/off) of the switch element 3 such that output voltage Vo is boosted, and a control circuit 7 which controls the on/off conduction ratio (duty ratio) when input voltage Vi is equal to or higher than reference voltage Vr. The startup circuit 6 is powered by the input power supply 1. The control circuit 7 is powered by output voltage Vo. Drive signals V1 and V2 output from the startup circuit 6 and the control circuit 7, respectively, drive the gate of the switch element 3. The startup circuit 6 includes an oscillation circuit 60 for generating pulse signal Vosc having a predetermined duty ratio, a current comparison circuit 61 which outputs a comparison result of the current of the switch element 3 and a predetermined restriction value, and a drive circuit 62 for generating drive signal V1 based on which the switch element 3 is turned on and off. Specifically, the drive circuit 62 turns on the switch element 3 based on pulse signal Vosc and turns off the switch element 3 based on output signal Vcmp of the current comparison circuit 61 or pulse signal Vosc.

The current comparison circuit 61 includes a voltage supply circuit 63 for generating threshold voltage Vth and a comparator 64. The comparator 64 compares drain voltage Vx of the switch element 3 and threshold voltage Vth to output signal Vcmp. When threshold voltage Vth is higher than drain voltage Vx, signal Vcmp is H-level. Namely, the comparator 64 utilizes the ON resistance of the switch element 3 to detect whether or not the current flowing through the switch element 3 has reached the restriction value. This does not require an additional current detector element, such as a current detection resistor, or the like, and hence results in a low loss.

In FIG. 1, the voltage supply circuit 50 generates reference voltage Vr, and the comparator 51 compares output voltage Vo and reference voltage Vr. The output of the comparator 51 serves as a startup signal for the control circuit 7 via a rising delay circuit 53 and also serves as a startup signal for the startup circuit 6 via an inverter 52. When output voltage Vo is lower than reference voltage Vr, the comparator 51 outputs L-level to cause the startup circuit 6 to operate and, meanwhile, stop the control circuit 7 so that its output terminal of drive signal V2 is rendered floating. When output voltage Vo is higher than reference voltage Vr, the comparator 51 outputs H-level to stop the startup circuit 6 so that its output terminal of drive signal V1 is rendered floating. Then, after the passage of the delay time set by the rising delay circuit 53, the control circuit 7 is caused to operate. With this delay time, at the transition of operation from the startup circuit 6 to the control circuit 7, simultaneous operation of these circuits can be avoided.

Figure 2:
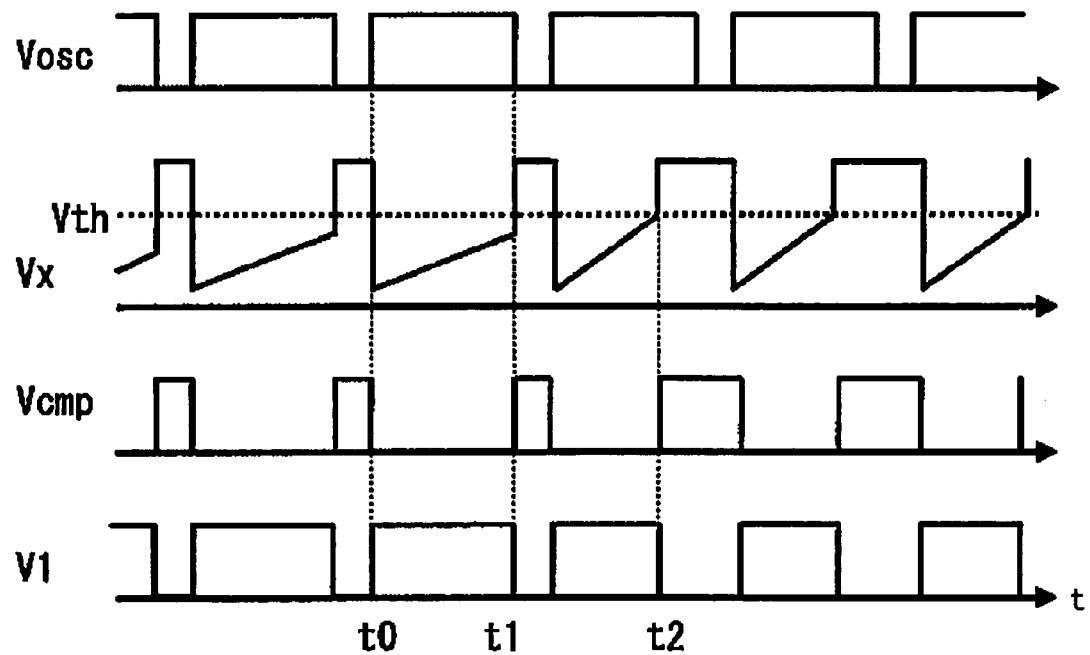
FIG. 2 shows the operation waveforms of the step-up power supply device of embodiment 1.

FIG. 2 is a timing chart for the operation of the principal part, showing the waveforms of pulse signal Vosc of the oscillation circuit 60, drain voltage Vx of the switch element 3, output signal Vcmp of the current comparison circuit 61, and drive signal V1 which is used for controlling the state (on/off) of the switch element 3.

Hereinafter, the operation of the step-up power supply device of embodiment 1 at the time of startup with a low input voltage is described with reference to FIG. 1 and FIG. 2. First, application of input voltage Vi causes the oscillation circuit 60 to start the operation so that the oscillation circuit 60 generates pulse signal Vosc having a predetermined duty ratio. At this point in time, duty ratio δ is expressed as follows:

$$\delta 0 > 1 - Vi_{min}/Vo1$$

where $Vi_{min}$ is the minimum value of input voltage Vi, and Vo1 is the target value of output voltage Vo (reference voltage Vr).

Referring to FIG. 2, at time t0, the drive circuit 62 causes drive signal V1, which is used for controlling the state (on/off) of the switch element 3, to rise in synchronization with the rising of pulse signal Vosc so that the switch element 3 is turned on. According to the turning-on of the switch element 3, drain voltage Vx of the switch element 3 decreases, and a current flows through the ON-resistance of the switch element 3, so that a voltage drop occurs. The current flowing through the switch element 3 is an excited current generated by application of input voltage Vi to the inductor 2 and therefore increases substantially linearly. Thus, drain voltage Vx also increases. The current comparison circuit 61 monitors drain voltage Vx to detect the current flowing through the switch element 3. If the current is equal to or lower than the restriction value, i.e., if drain voltage Vx is lower than threshold voltage Vth, output signal Vcmp of the current comparison circuit 61 is L-level. The drive circuit 62 maintains drive signal V1 at H-level to keep the switch element 3 ON. In this case, drop of drive signal V1 to L-level such that the switch element 3 is turned off occurs at time t1 in synchronization with the falling of pulse signal Vosc. Namely, the switch element 3 turns on/off in the same phases with pulse signal Vosc.

However, when the current flowing through the switch element 3 greatly increases in the case of a high input voltage, drain voltage Vx exceeds threshold voltage Vth at time t2. Namely, when the current flowing through the switch element 3 reaches the restriction value, output signal Vcmp of the current comparison circuit 61 transitions to H-level. Meanwhile, the drive circuit 62 causes drive signal V1, which is used for controlling the state (on/off) of the switch element 3, to drop to L-level so that the switch element 3 is turned off.

As described above, the startup circuit 6 of embodiment 1 operates to restrict the current flowing through the switch element 3 such that an excessive inrush current does not flow in the case of a high input voltage while the duty ratio is set such that output voltage Vo reaches reference voltage Vr even in the case of a low input voltage. When output voltage Vo reaches reference voltage Vr, the startup circuit 6 stops the operation so that the output terminal of drive signal V1 is rendered floating and, on the other hand, the control circuit 7 starts the operation to control the state (on/off) of the switch element 3 such that output voltage Vo is stabilized at the target value.

Embodiment 2

Figure 3:
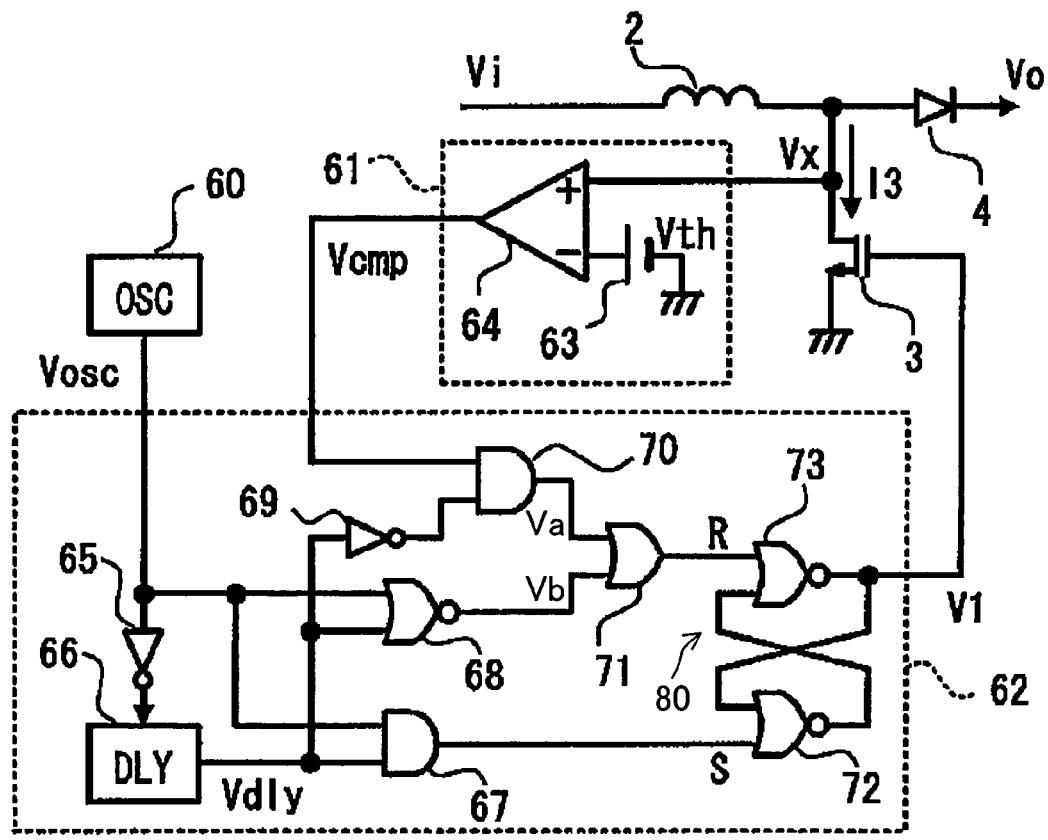
FIG. 3 shows a circuit structure of a step-up power supply device according to embodiment 2 of the present invention.

FIG. 3 shows a structure of a drive circuit of a step-up power supply device according to embodiment 2 of the present invention, with a detailed illustration of a delay circuit with which the effects of a surge current produced by turning on a switch element are removed. In FIG. 3, the same elements as those of the step-up power supply device of embodiment 1 shown in FIG. 1 are not shown or denoted by the same reference numerals, and the descriptions thereof are herein omitted.

In the drive circuit 62 shown in FIG. 3, an inverter 65 inverts pulse signal Vosc received from the oscillation circuit 60, and a delay circuit 66 delays the inverted signal for a predetermined time interval to generate signal Vdly. Both pulse signal Vosc and delayed inverted signal Vdly are input to an AND circuit 67 and NOR circuit 68. An inverter 69 inverts delayed inverted signal Vdly. The output of the inverter 69 and output signal Vcmp of the current comparison circuit 61 are input to an AND circuit 70. Output Va of the AND circuit 70 and output Vb of the NOR circuit 68 are input to an OR circuit 71. A NOR circuit 72 and a NOR circuit 73 constitute an RS latch 80. The output of the AND circuit 67 is input as set signal S to the NOR circuit 72. The output of the OR circuit 71 is input as reset signal R to the NOR circuit 73. The output of the NOR circuit 73 is output as drive signal V1 of the drive circuit 62.

Figure 4:
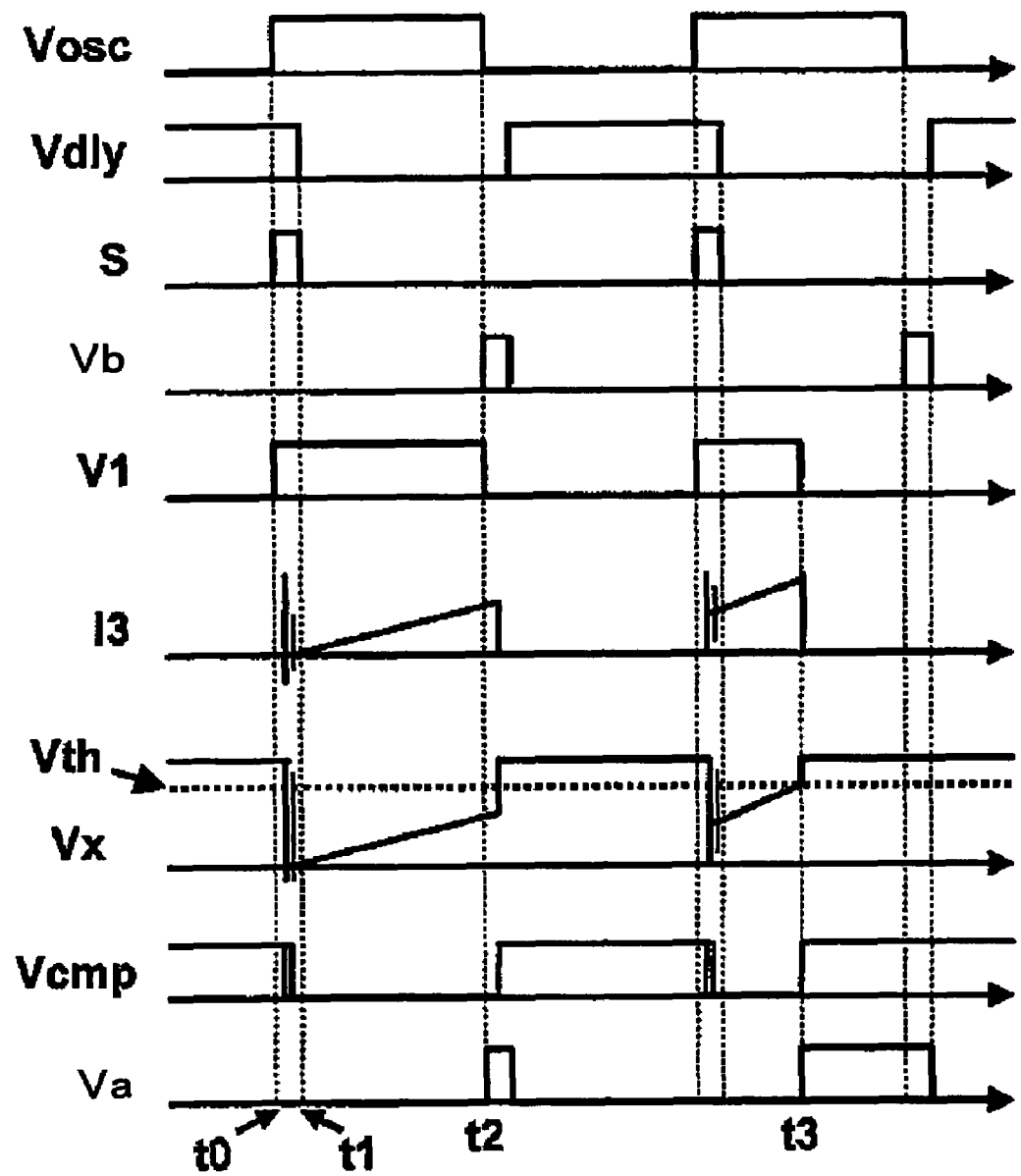
FIG. 4 shows the operation waveforms of the step-up power supply device of embodiment 2.

FIG. 4 is a timing chart for the operation of respective parts of the step-up power supply device of embodiment 2, showing the waveforms of pulse signal Vosc of the oscillation circuit 60, delayed signal Vdly, set signal S output from the AND circuit 67, output signal Vb of the NOR circuit 68, drive signal V1 used for controlling the state (on/off) of the switch element 3, drain current I3 of the switch element 3, drain voltage Vx of the switch element 3, output signal Vcmp of the current comparison circuit 61, and output signal Va of the AND circuit 70.

The operation of the step-up power supply device having the above-described structure shown in FIG. 3 at the time of startup is described with reference to FIG. 4. At time t0 shown in FIG. 4, pulse signal Vosc rises while delayed inverted signal Vdly is still H-level, so that the AND circuit 67 places set signal S at H-level. Accordingly, the RS latch 80 is set such that drive signal V1 is at H-level. Thus, the switch element 3 is turned on.

When the switch element 3 is turned on, the charge accumulated in the parasitic capacitance which equivalently exists between the drain and source of the switch element 3, the ON-resistance of the switch element 3, and the wire inductor constitute a resonant circuit. Thus, a surge current flows through the switch element 3 to produce damped oscillation. Drain voltage Vx of the switch element 3 experiences a voltage drop due to drain current I3 flowing through the ON-resistance. When the switch element 3 is turned on, threshold voltage Vth fluctuates due to the dampedly-oscillating current. As a result, output signal Vcmp of the current comparison circuit 61 also oscillates between H-level and L-level. However, this oscillation of output signal Vcmp is neglected by the AND circuit 70 in which the inverse of delayed inverted signal Vdly is input.

After the delay time of the delay circuit 66 has been passed, i.e., at time t1, delayed inverted signal Vdly transitions to L-level so that set signal S of the AND circuit 67 also transitions to L-level. Meanwhile, H-level is input from the inverter 69 to the AND circuit 70 so that the AND circuit 70 outputs output signal Vcmp derived from the current comparison circuit 61. Namely, the delay time of the delay circuit 66 corresponds to the interval where error detections of output signal Vcmp of the current comparison circuit 61 which accompany the oscillating current produced by turning on the switch element 3 are neglected. Thereafter, drain current I3 flowing through the switch element 3 increases substantially linearly. If drain current I3 is equal to or lower than the restriction value, i.e., if drain voltage Vx is lower than threshold voltage Vth, signal output Vcmp of the current comparison circuit 61 is maintained at L-level.

At time t2, pulse signal Vosc transitions to L-level while delayed inverted signal Vdly is still at L-level, so that the NOR circuit 68 places output signal Vb at H-level. This H-level signal is transmitted via the OR circuit 71 and resets the RS latch 80. Accordingly, drive signal V1, which is used for controlling the state (on/off) of the switch element 3, drops to L-level so that the switch element 3 is turned off.

If drain current I3 flowing through the switch element 3 greatly increases in the case of a high input voltage, drain voltage Vx exceeds threshold voltage Vth at time t3. Since time t3 comes after the passage of the delay time of the delay circuit 66, output signal Va of the AND circuit 70 is H-level. This H-level signal is transmitted via the OR circuit 71 and resets the RS latch 80. Accordingly, drive signal V1 drops to L-level so that the switch element 3 is turned off. Namely, after the passage of the delay time of the delay circuit 66, drain current I3 flowing through the switch element 3 reaches the restriction value, so that the drive circuit 62 causes drive signal V1 to drop to L-level, and the switch element 3 is turned off.

As described above, the startup circuit 6 of embodiment 2 operates to restrict the current flowing through the switch element 3 such that an excessive inrush current does not flow in the case of a high input voltage while the duty ratio is set such that output voltage Vo reaches reference voltage Vr even in the case of a low input voltage. Further, the unstable operation of the current comparison circuit 61 due to a surge current produced by turning on the switch element 3 can be neglected during the predetermined time set by the delay circuit 66.

Embodiment 3

Figure 5:
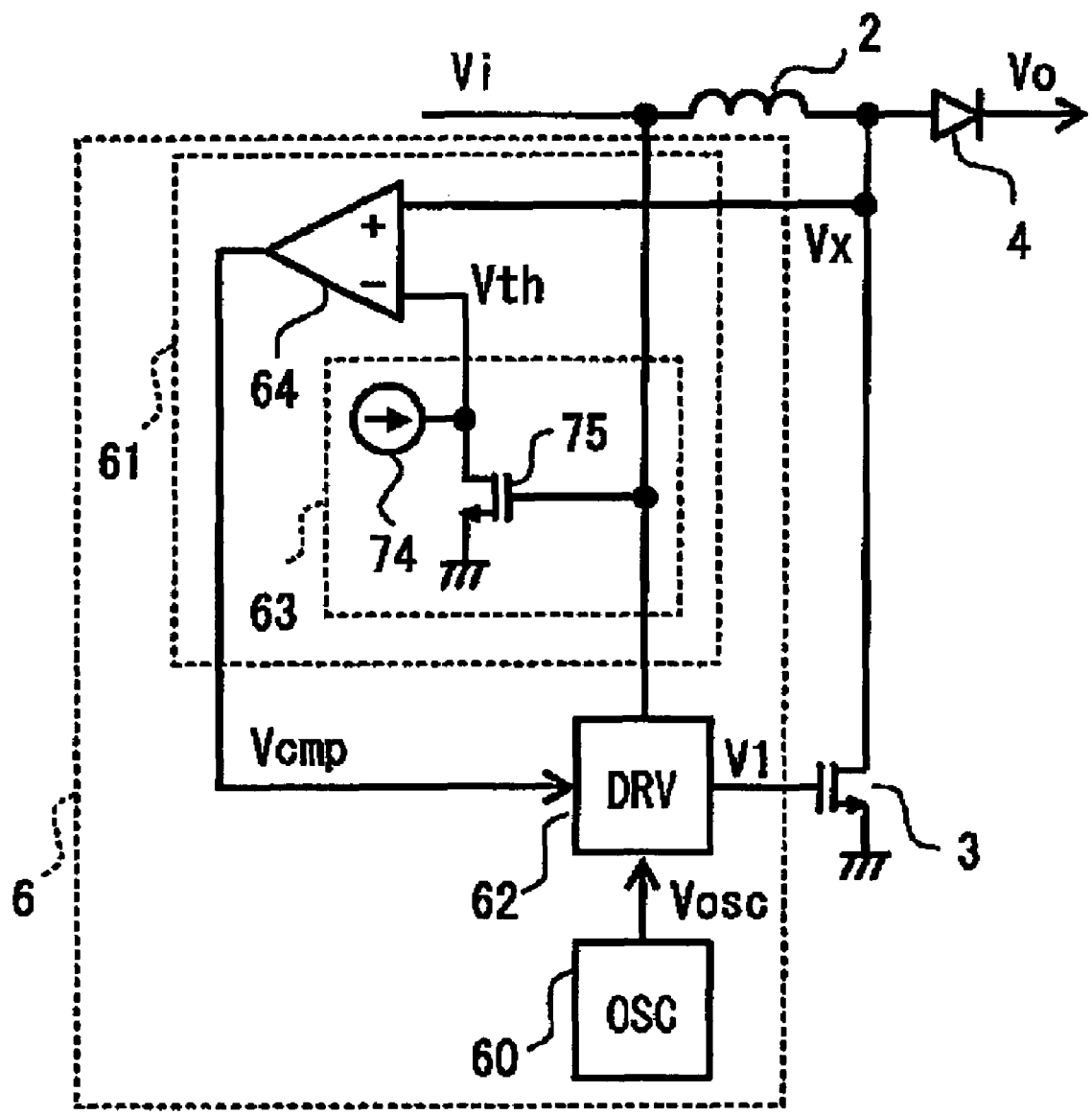
FIG. 5 shows a circuit structure of a step-up power supply device according to embodiment 3 of the present invention.

FIG. 5 shows a structure of a drive circuit of a step-up power supply device according to embodiment 3 of the present invention, with a detailed illustration of a current comparison circuit with which fluctuations of the ON-resistance of the switch element are corrected. In FIG. 5, the same elements as those of the step-up power supply device of embodiment 1 shown in FIG. 1 are not shown or denoted by the same reference numerals, and the descriptions thereof are herein omitted.

The current comparison circuit 61 shown in FIG. 5 includes a constant current source circuit 74 and an NMOS transistor 75 which is formed on the same semiconductor substrate as the switch element 3 is. The NMOS transistor 75 receives input voltage V1 at the gate. When the NMOS transistor 75 is ON, a constant current derived from the constant current source circuit 74 flows through the NMOS transistor 75. The constant current source circuit 74 and the NMOS transistor 75 constitute the voltage supply circuit 63. The voltage supply circuit 63 outputs the ON-voltage of the NMOS transistor 75 as threshold voltage Vth.

In the above-described step-up power supply devices of embodiments 1 and 2, the startup circuit 6 which operates at the time of startup is powered by the input power supply 1. Thus, when drive signal V1 applied to the gate of the switch element 3 is equal to input voltage Vi, the switch element 3 is ON. The NMOS transistor which constitutes the switch element 3 has such a characteristic that the ON-resistance decreases as the gate voltage increases. Therefore, disadvantageously, the ON-resistance fluctuates according to input voltage Vi, and the current detection level accordingly fluctuates. The fluctuations of the ON-resistance depend not only on the voltage applied to the gate but also on the ambient temperature.

In the step-up power supply device of embodiment 3 shown in FIG. 5, threshold voltage Vth, which is to be compared with the ON-voltage of the switch element 3, is the ON-voltage of the NMOS transistor 75 as in the switch element 3. Therefore, when the ON-resistance of the switch element 3 changes according to the voltage applied to the gate or temperature, threshold voltage Vth also changes accordingly. For example, threshold voltage Vth is set lower as input voltage Vi becomes higher, and thus, the increase of the detection current, which can be caused by decrease in the ON-resistance of the switch element 3 due to a high input voltage, is prevented. With this feature, drain current I3 flowing through the switch element 3 can be compared with a constant multiple of the constant current derived from the constant current source circuit 74 irrespective of variations in the conditions, and therefore, variations in the ON-resistance of the switch element 3 can be corrected. By restricting the current of the switch element 3 with high resolution, the likelihood of the restriction value is suppressed so that the inrush current can be effectively suppressed.

In embodiment 3, input voltage Vi is applied to the gate of the NMOS transistor 75. This is because the startup circuit 6 is powered by the input power supply 1, and the switch element 3 is turned on when drive signal V1 applied to the gate of the switch element 3 is equal to input voltage Vi. If the startup circuit 6 is powered by output voltage Vo and the gate voltage of the switch element 3 is also equal to output voltage Vo, a structure where output voltage Vo is also applied to the gate of the NMOS transistor 75 is employed as a matter of course.

Embodiment 4

Figure 6:
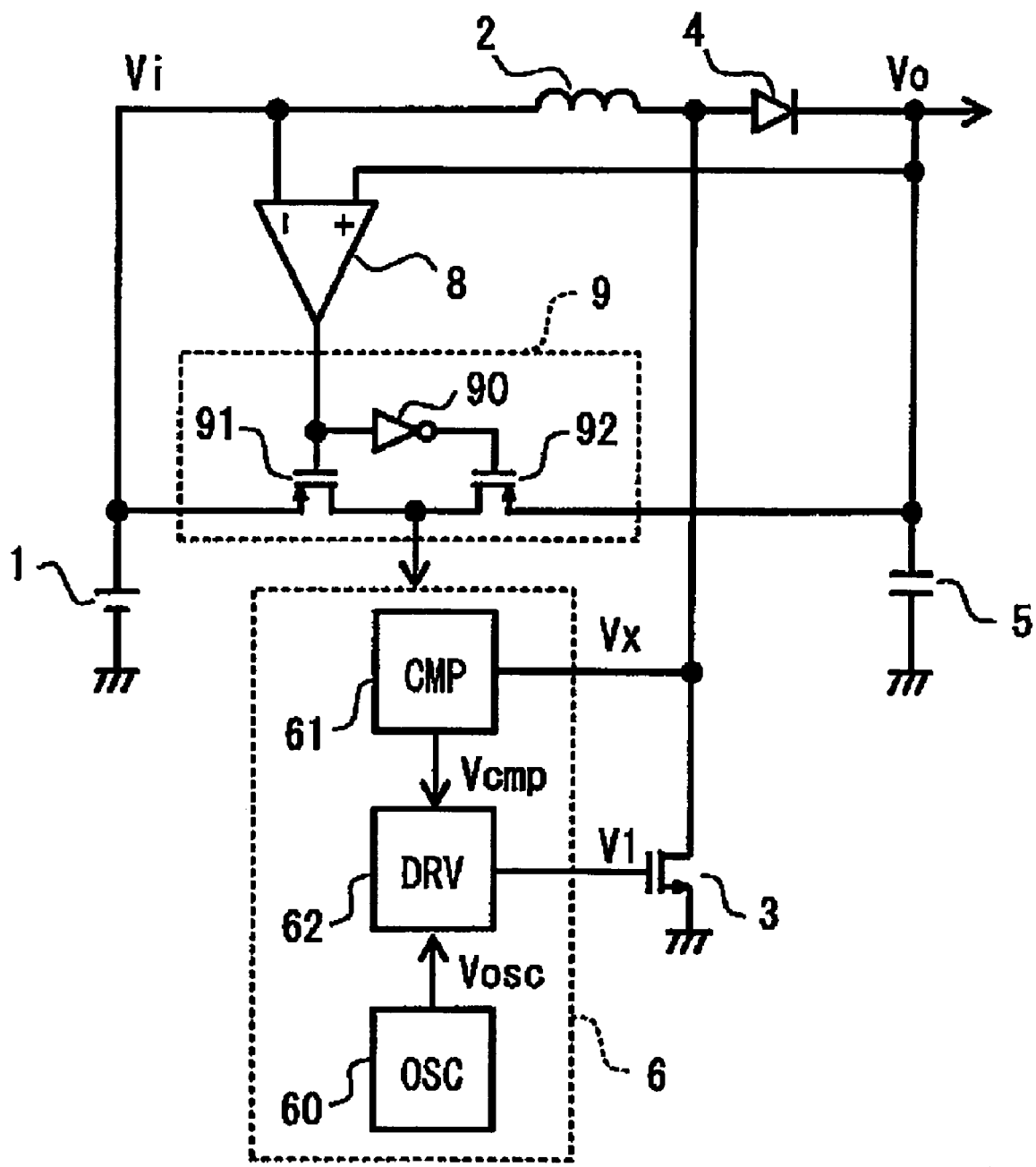
FIG. 6 shows a circuit structure of a step-up power supply device according to embodiment 4 of the present invention.
Figure 7:
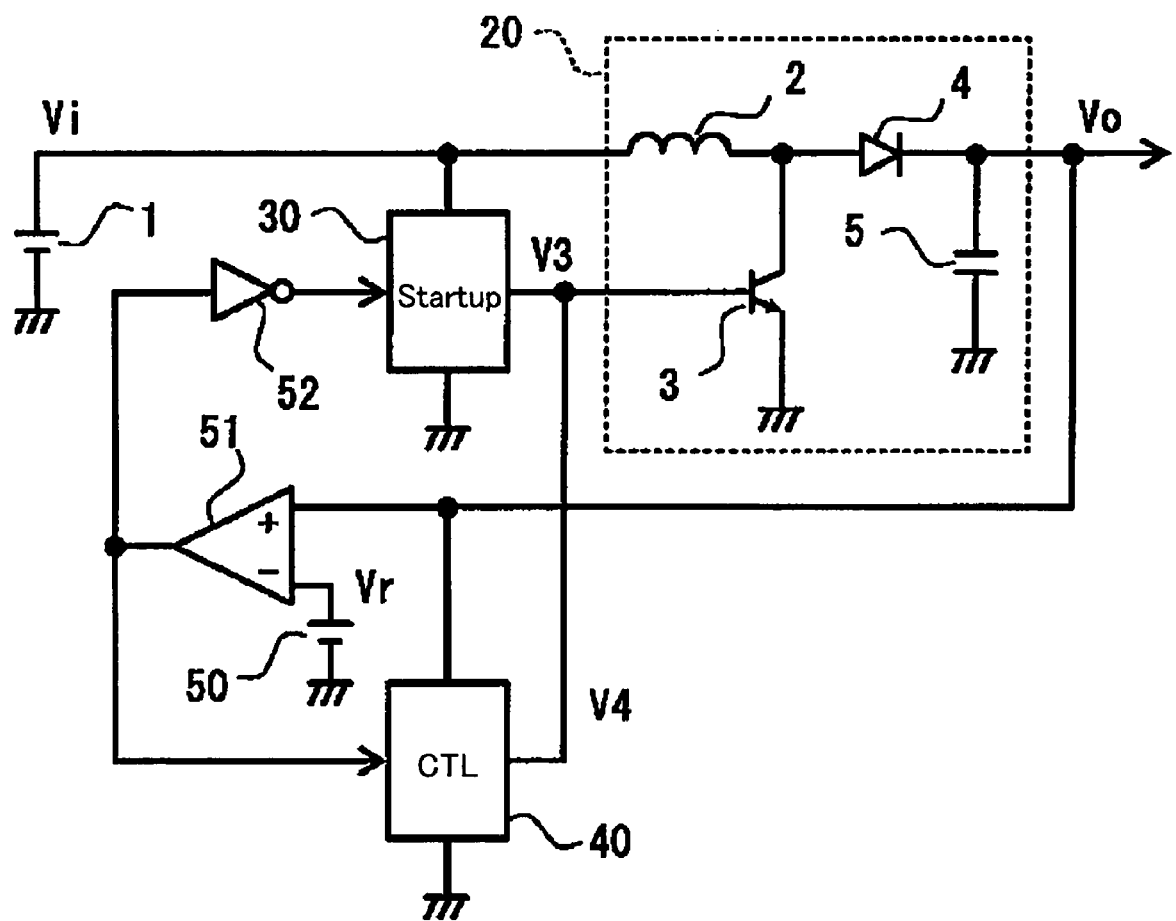
FIG. 7 shows a circuit structure of a conventional step-up power supply device.

FIG. 6 shows a structure of a step-up power supply device according to embodiment 4 of the present invention, with an illustration of a structure which supplies the supply voltage to the startup circuit 6. In FIG. 6, the same elements as those of the step-up power supply device of embodiment 1 shown in FIG. 1 are not shown or denoted by the same reference numerals, and the descriptions thereof are herein omitted.

The step-up power supply device shown in FIG. 6 includes a comparator 8 which compares input voltage Vi and output voltage Vo, and a switch circuit 9 which is driven by the comparator 8. The switch circuit 9 includes an inverter 90 for inverting the output of the comparator 8, a PMOS transistor 91 which is driven based on the output of the comparator 8, and PMOS transistors 91 and 92 which are driven based on the output of the inverter 90. The PMOS transistor 91 has a source to which input voltage Vi is applied. The PMOS transistor 92 has a source to which output voltage Vo is applied. The drains of the PMOS transistors 91 and 92 are coupled together to form the output terminal of the switch circuit 9, from which the supply voltage is supplied to the startup circuit 6.

With the above features, if input voltage Vi is higher among the input and output voltages, the PMOS transistor 91 is ON so that the switch circuit 9 outputs input voltage V1. If output voltage Vo is higher, the PMOS transistor 92 is ON so that the switch circuit 9 outputs output voltage Vo. Namely, the startup circuit 6 is supplied with the higher one of the input and output voltages as the supply voltage.

Conventionally, the switch element 3 is realized by an NMOS transistor. When the control circuit 7 powered by output voltage Vo applies a high drive voltage during the normal operation to the gate of the switch element 3 as drive signal V2 which is used for controlling the state (on/off) of the switch element 3, a current disadvantageously flows via a parasitic diode (not shown) which exists in the drive stage of the startup circuit 6 in the case of a low input voltage. However, with the structure where the startup circuit 6 is supplied with the higher one of the input and output voltages as the supply voltage as in embodiment 4, no current flows via the parasitic diode which exists in the drive stage.

It should be noted that the step-up power supply devices of embodiments 1 to 4 use a diode as the rectifier, but the present invention is not limited thereto. They may be a synchronous rectifier including, in place of the diode, a switch element which is turned on/off in the opposite phases to the switch element 3. In this case, it is natural that the drive signal used for controlling the state (on/off) of both of the switch elements need to have a blank interval where the switch element which constitutes the synchronous rectifier and the switch element 3 are simultaneously OFF such that the switch element which constitutes the synchronous rectifier and the switch element 3 are not ON simultaneously.

Alternatively, the switch element which constitutes the synchronous rectifier may be formed by a PMOS transistor such that the output of the switch circuit 9 of embodiment 4 is directly connected to the backgate of the PMOS transistor. In this case, the body diode of the PMOS transistor which constitutes the synchronous rectifier is switched with the input side being the forward direction even when the output voltage is lower than the input voltage. Thus, flow of an excessive current from the input to the output is prevented.

What is claimed is:

1. A step-up power supply device, comprising:
    a step-up converter including an inductor and switch element which are connected in series and a rectifier and smoother which rectify and smooth a voltage across the switch element, the step-up converter being designed such that an input voltage to the inductor is boosted by an on/off operation of the switch element and an output voltage is output from the smoother;
    a startup circuit which controls the on/off operation of the switch element when the output voltage is smaller than a reference voltage; and
    a control circuit which operates in substitution for the startup circuit when the output voltage is higher than the reference voltage to control the on/off operation of the switch element such that the output voltage reaches a target value,
    wherein the startup circuit includes
        an oscillation circuit for generating a pulse signal which has a predetermined on/off ratio,
        a current comparison circuit for comparing a current of the switch element with a predetermined restriction value, and
        a drive circuit for generating a drive signal based on which the switch element is turned on/off, the drive signal being generated from the pulse signal to turn on the switch element, and the drive signal being generated from the output of the current comparison circuit or the pulse signal to turn off the switch element.

2. The step-up power supply device of claim 1, further comprising:
    a comparator for comparing the output voltage and a predetermined voltage value to drive any one of the startup circuit and the control circuit based on a result of the comparison; and
    a delay circuit for delaying, at a transition from the startup circuit to the control circuit, start of an operation of the control circuit for a predetermined time interval.

3. The step-up power supply device of claim 1, wherein the ratio of OFF-period in one cycle of the pulse signal is smaller than the ratio of a minimum value of the input voltage and the reference voltage.

4. The step-up power supply device of claim 1, wherein the current comparison circuit includes a comparator for comparing an ON-voltage of the switch element and a predetermined threshold voltage.

5. The step-up power supply device of claim 4, wherein the drive circuit neglects a comparison result of the comparator during a predetermined period after the switch element is turned on.

6. The step-up power supply device of claim 4, wherein the drive circuit generates, as the drive signal, a signal based on which the switch element is turned on at a rise of the pulse signal and is turned off when the output of the current comparator indicates that the ON-voltage of the switch element is equal to or higher than the predetermined threshold voltage or at a fall of the pulse signal.

7. The step-up power supply device of claim 6, wherein:
    the switch element is an NMOS transistor;
    the predetermined threshold voltage of the current comparison circuit is set lower as the input voltage is higher; and
    the drive circuit employs the input voltage as a supply voltage.

8. The step-up power supply device of claim 6, wherein:
    the switch element is an NMOS transistor;
    the predetermined threshold voltage of the current comparison circuit is set lower as the output voltage is higher; and
    the drive circuit employs the output voltage as a supply voltage.

9. The step-up power supply device of claim 1, further comprising:
    a comparator for comparing the input voltage and the output voltage; and
    a switch circuit which is driven according to an output of the comparator such that the switch circuit outputs the input voltage when the input voltage is higher but outputs the output voltage when the output voltage is higher,
    wherein the drive circuit employs an output of the switch circuit as a supply voltage.

* * * * *